United States Patent [19]

Feijen et al.

[11] Patent Number: 5,658,967
[45] Date of Patent: Aug. 19, 1997

[54] PROVIDING A SURFACE WITH CARBOXYL GROUPS AND SURFACE AND PRODUCT THUS PROVIDED

[75] Inventors: Jan Feijen; Johannes G. A. Terlingen, both of Hengelo; Jan Pleun Lens, Enschede, all of Netherlands

[73] Assignee: Cordis Corporation, Miami Lakes, Fla.

[21] Appl. No.: 443,846

[22] Filed: May 18, 1995

[30] Foreign Application Priority Data

May 19, 1994 [NL] Netherlands ............................. 9400826

[51] Int. Cl.$^6$ ........................................................ C08J 3/28
[52] U.S. Cl. ...................... 522/118; 522/119; 522/120; 522/121; 522/123; 525/285; 525/301; 525/298; 427/488; 427/491
[58] Field of Search ........................... 522/118, 119, 522/120, 121, 123, 127, 129, 130, 141, 142, 144; 525/285, 298, 301; 427/488, 491

[56] References Cited

U.S. PATENT DOCUMENTS 5,069,926  12/1991  Iwata et al. ............................. 427/40

FOREIGN PATENT DOCUMENTS

| | | |
|---|---|---|
| 424873 | 2/1991 | European Pat. Off. . |
| 56-157437 | 4/1981 | Japan . |
| 59-163473 | 9/1984 | Japan . |
| 5076734 | 3/1993 | Japan . |

OTHER PUBLICATIONS

Immobilization of Surface Active Compounds on Polymer Supports Using a Gas Discharge Process, Terlingen et al, *Journal of Biomaterials Science, Polymer Ed.* vol. 4, No. 1, pp. 31–33 (1992).

Effect of Glow Discharge Treatment of Poly(Acrylic Acid) Preadsorbed onto Poly(ethylene), Terlingen et al, *Journal of Applied Polymer Science*, vol. 50, pp. 1529–1539, 1993.

*Primary Examiner*—Edward J. Cain
*Attorney, Agent, or Firm*—Lockwood, Alex, Fitzgibbon & Cummings

[57] ABSTRACT

The invention relates to a method for providing a surface with carboxyl groups. A compound is applied to the surface with at least one functional group which can be converted into a carboxyl group. Thereafter, this surface is treated with a plasma to immobilize the compound, and then the functional group is converted into a carboxyl group. Also provided is a surface having carboxyl groups which is obtained with this method and a product with such a surface for exposure to blood, typically in vivo blood flows.

26 Claims, No Drawings

PROVIDING A SURFACE WITH CARBOXYL GROUPS AND SURFACE AND PRODUCT THUS PROVIDED

BACKGROUND AND DESCRIPTION OF THE INVENTION

The present invention relates to a method for providing a surface with carboxyl groups, to a surface which is provided in this manner with carboxyl groups, and to a product provided with such a surface which is suitable for exposure to blood.

Using conventional chemical processes, often it is not possible to selectively link ionogenic groups to a hydrophobic plastic or polymeric substrate surface. Terlingen, J. G. A. et al, (Journal of Colloid and Interface Science, 155, 55–65 (1993) which is incorporated by reference hereinto), describe a method for immobilizing sulphate groups on polypropylene. A similar method for immobilizing carboxyl groups on the plastic or polymeric surface appears however not to work (Terlingen, J. G. A. et al, Journal of Applied Polymer Science, 50, 1529–1539 (1993) which is incorporated by reference hereinto).

The present invention is based on the insight that when a plasma treatment is performed on a surface on which compounds with carboxyl groups are adsorbed, these carboxyl groups are not sufficiently resistant to the etching effect of the plasma treatment. It has been found from further research, however, that by making use not of compounds with carboxyl groups but of compounds with functional groups which can be converted after the plasma treatment into carboxyl groups which have a better resistance to the etching effect of the plasma treatment, the surface in question can thus be successfully provided with carboxyl groups via plasma treatment. After immobilization with the plasma treatment, the functional group then can be converted into a carboxyl group while avoiding loss or disappearance of the covalent bond between the compound and the surface.

In summary, the present invention therefore relates to a method for providing a surface with carboxyl groups, comprising the steps of successively:
(i) applying to the surface to be treated a compound with at least one functional group which can be converted into a carboxyl group;
(ii) treating the surface onto which the compound has been applied with a plasma to immobilize the compound; and
(iii) converting the functional groups of the immobilized compound into a carboxyl group.

Any type of functional group can in principle be applied. It is of course important that the functional group have a better resistance to the etching action of the plasma treatment than does a carboxyl group. Also, the compound having the functional group is to be capable of being immobilized by the plasma treatment by means of a covalent bonding to the surface, and the functional group should be substantially fully convertible into a carboxyl group. Functional groups meeting these requirements include carboxylate groups, aldehyde groups and alcohol groups.

Compounds with such a functional group can be applied to a plastic or polymeric surface in accordance with any known method, for instance a mechanical method comprising spinning a liquid onto the surface or applying a film to the surface, in both cases followed by evaporation of the solvent. Another method for applying the compound provided with a functional group to a plastic or polymeric surface includes adsorbing the compound from a liquid phase.

In those instances where the surface is a hydrophobic surface, it is further recommended that the compound containing the functional group have surfactant properties. An advantageous embodiment of the surfactant is a fatty acid salt such as alkali and alkali metal salts of fatty acids, or their corresponding alcohols and aldehydes. An example is the sodium salt of undecylenic acid, or sodium undecylenate.

For particular applications of the surface (for instance where the surface is intended for uses having exposure to blood), it can be advantageous that the surface is not only provided with carboxyl groups but also with $SO_3^-$ groups under these conditions it is further recommended that a compound containing at least one $SO_3^-$ group is applied to the surface being treated. According to a particularly advantageous embodiment, the compounds with the functional groups and the compounds with the $SO_3^-$ groups can be adsorbed simultaneously.

Examples of compounds containing $SO_3^-$ groups which can be used in this regard include organic sulphate (—C—O—$SO_3^-$) groups, sulphamate (—CNH—$SO_3^-$) groups and sulphonate (—C—$SO_3^-$) groups. Suitable organic compounds with sulphate and/or sulphonate groups are generally known. Compounds with sulphamate groups can be prepared according to the Warner method as generally disclosed in Warner, D. T. et al, J. Org. Chem. 23, 1133–1135 (1958), incorporated by reference hereinto. These compounds containing $SO_3^-$ groups are preferably provided in the form of a surfactant, such as an analog of the corresponding fatty acid.

In order to avoid compounds being adsorbed on the surface but not immobilized by means of the plasma treatment, it is further recommended that the plastic or polymeric surface is subjected, after the plasma treatment, to a washing treatment. Compounds which are adsorbed but not immobilized are thus removed from the surface.

Another aspect of the present invention relates to a surface provided with carboxyl groups, which surface can be obtained by making use of the above described method according to the invention which comprises successively applying compounds containing the functional groups followed by a plasma treatment. This surface further also can be provided with $SO_3^-$ groups.

In another aspect of the present invention, same relates to a product provided with such a surface which is suitable for exposure to blood. It has in any case been found that a surface provided with both sulphate functional groups and carboxyl functional groups can result in an improvement of the compatibility of such products with blood, making them especially suitable for in vivo applications.

DESCRIPTION OF THE PREFERRED EMBODIMENTS

Surfaces which can be provided with carboxyl and optionally $SO_3^-$ groups according to the present invention comprise plastic surfaces, shaped polymeric surfaces, and inorganic surfaces. Examples of plastic surfaces or shaped polymeric surfaces which can be provided with carboxyl and optionally sulphate groups according to the invention include polyolefins such as polyethylene and polypropylene, polyesters, polystyrene, polyethers, polyamides, polyurethanes, polysiloxanes, polyacetates, polyacrylates and the like. Inorganic surfaces examples are glass, silicates and metals. Furthermore, the carboxyl and/or sulphate groups can be applied to a plastic on an inorganic base.

The compounds with a functional group as discussed herein and/or with an $SO_3^-$ group to be used encompass all types of compounds which can be adsorbed on such surfaces from the liquid or gas phase. Suitable compounds include those with alkyl chains of from 2 to 30 carbon atoms, which chains can be straight, branched, saturated, mono-unsaturated, poly-unsaturated and/or interrupted by one or more heterogeneous atoms such as nitrogen, oxygen and sulphur. Such chain can be substituted with one or more substituents such as hydroxyl, oxo, acyloxy, amino, nitro, cyano, halogeno, sulphydryl, and the like, provided that the adsorption properties and stability properties are not adversely affected during plasma treatment.

Especially suitable compounds are surfactants such as fatty acid salts of saturated or unsaturated fatty acids such as the alkali and alkali earth metal salts of undecylenic acid and lauryl acid, wherein it is noted that the use of an unsaturated fatty acid salt produces a higher immobilization efficiency. In addition the corresponding aldehydes and alcohols can be used.

In connection with the plasma treatment carried out according to the invention, a standard plasma apparatus as described for instance in Terlingen, J. G. A. et al, referred to herein, can be used. Suitable plasma gases for use therein include argon and/or hydrogen.

The adsorption treatment with the compound containing the functional group and optionally $SO_3^-$ group comprises immersing the plastic surface or the like in a solution containing such a compound. After a time (for instance up to about 5 hours) the adsorption-treated plastic surface or the like is removed and dried under vacuum at room temperature. The solution of the compound or compounds is chosen such that after drying these compounds remain adsorbed on the plastic surface or the like.

After the plasma treatment, the plastic surface or the like is immersed in water, for instance for up to about 5 hours, then rinsed twice with water and dried under vacuum at room temperature, in order to remove non-immobilized compounds from the surface.

The presence of immobilized carboxyl groups on the treated surface can be ascertained using X-ray photoelectrospectroscopy (XPS) after the carboxyl group has been converted into a carboxylate group or has been substituted with a substituent containing and ester-linked fluorine (as would occur upon treatment with 2,2,2-trifluoroethanol (TFE)).

The invention will be further elucidated hereinbelow with reference to a number of embodiments and examples.

EXAMPLE 1

A polyethylene plastic film (thickness 0.2 mm) was immersed in an aqueous 0.29M solution of the sodium salt of undecylenic acid. After 1 hour the plastic film was removed and dried under vacuum at room temperature. The plastic film was subsequently treated with plasma (45 W, 0.07 mbar, 0.5–60 sec.). Argon was used as the gas plasma medium.

After the plasma treatment, the film was immersed in water for 1 hour at room temperature, subsequently washed twice with water and dried under vacuum at room temperature.

To detect the carboxyl groups which are immobilized on the polyethylene film surface, the polyethylene film was treated with gas phase 2,2,2-trifluoroethanol (TFE), after which the quantity of fluorine and oxygen was determined using XPS. With an argon plasma treatment of 5 seconds the quantity of fluorine amounted to 4.9 atom% and the quantity of oxygen amounted to 5.9 atom%. Therefore, 55% of the oxygen is present as carboxyl groups, which corresponds to an immobilization efficiency of 29%. With an argon plasma treatment of a polyethylene film surface onto which no sodium salt of undecylenic acid was adsorbed, the quantity of fluorine amounted to 1.2 atom % and the quantity of oxygen amounted to 9.4 atom %. Therefore, 9% of the oxygen is present as carboxyl groups.

EXAMPLE 2

The experiment of Example 1 was repeated, except that instead of the sodium salt of undecylenic acid, polyacrylic acid was used. An additional quantity of carboxyl groups as compared to a polyethylene film onto which no polyacrylic acid was absorbed could not be determined after plasma treatment.

EXAMPLE 3

For comparison with Example 1, polyethylene films which were adsorbed with the sodium salt of undecylenic acid or the sodium salt of dodecane acid were treated with an argon plasma.

After a treatment time of 20 seconds, 9.8% of the total amount of oxygen was situated on the surface of the polyethylene film treated with the sodium salt of dodecane acid and had the form of carboxylate groups. This corresponds with an immobilization efficiency of only 2%.

In the case the polyethylene films were treated (5 seconds) with the sodium salt of undecylenic acid, 55% of the total amount of oxygen was situated on the surface in the form of carboxylate groups, which corresponds with an immobilization efficiency of 29%.

EXAMPLE 4

Sodium salt of undecylenic acid and sodium docylsulphate were adsorbed on polyethylene films by immersing these films in an aqueous solution containing undecilene acid and sodium dodecylsulphate in a ratio of 1:1. After an adsorption time of 5 minutes, the films were removed and dried. The films were treated with an argon plasma (45W; 0.07 mbar) and washed with water. Thereafter a reaction with gas phase TFE was performed. After a plasma treatment time of 2 seconds, 7.8 atom% oxygen, 0.3 atom % sulphur, and 2.3 atom% fluorine were measured on the surface of the films using XPS. The presence of sulphur on the polyethylene surface indicates immobilization of adsorbed sodium dodecylsulphate. If all sulfur is present in the form of sulphate groups, 29% of the oxygen is then present as sulphate groups, and this results in immobilization efficiency of 15% for sodium dodecylsulphate.

The presence of fluorine on the polyethylene surface indicates immobilization of adsorbed sodium salt of undecilene acid. Thus, 20% of the oxygen is present as carboxyl groups; and an immobilization efficiency of the sodium salt of undecylenic acid is 31%.

It will be understood that the embodiments of the present invention which have been described are illustrative of some of the applications of the principles of the present invention. Various modifications may be made by those skilled in the art without departing from the true spirit and scope of the invention.

We claim:

1. A method for providing a surface with carboxyl groups, comprising the steps of:

(i) applying to a surface to be treated a compound with at least one functional group which can be converted into a carboxyl group;

(ii) treating the surface with a plasma to immobilize the compound; and (iii) converting the functional group into a carboxyl group.

2. The method as claimed in claim 1, wherein the functional group which can be converted into a carboxyl group is selected from the group consisting of a carboxylate group, an aldehyde group and an alcohol group.

3. The method as claimed in claim 1, wherein the compound is adsorbed on the surface.

4. The method as claimed in claim 2, wherein the compound is adsorbed on the surface.

5. The method as claimed in claim 1, wherein the compound with a functional group which can be converted into a carboxyl group is a surfactant.

6. The method as claimed in claim 5, wherein the surfactant is a fatty acid salt.

7. The method as claimed in claim 1, wherein a compound containing at least one $SO_3^-$ group also is immobilized on the surface.

8. The method as claimed in claim 7, wherein the compound containing the $SO_3^-$ group is a surfactant.

9. The method as claimed in claim 7, wherein the compound with a functional group which can be converted into a carboxyl group and the compound containing an $SO_3^-$ group are simultaneously or successively immobilized on the surface.

10. The method as claimed in claim 1, wherein the surface is subjected after the plasma treatment to a washing treatment.

11. The method as claimed in claim 1, wherein the surface is a plastic surface of a shaped polymer.

12. The method as claimed in claim 1, wherein the surface is an inorganic surface.

13. The method as claimed in claim 1, wherein the surface is an inorganic surface having a polymer applied thereto.

14. The method as claimed in claim 1, wherein said compound is a surfactant which is a fatty acid salt, alcohol or aldehyde of undecylenic acid or lauryl acid.

15. The method as claimed in claim 7, wherein said compound containing at least one $SO_3^-$ group is selected from the group consisting of an organic sulphate, a sulphamate, and a sulphonate compound.

16. A surface provided with carboxyl groups, the surface having been prepared in accordance with a method comprising the steps of:

(i) applying to a surface to be treated a compound having at least one site with a non-carboxyl functional group which can be converted into a carboxyl group;

(ii) treating the surface with a plasma to immobilize the compound into an immobilized compound; and (iii) converting the non-carboxyl functional group into a carboxyl group, said surface being provided with a carboxyl group converted from said non-carboxyl functional group at said site on the immobilized compound.

17. The surface as claimed in claim 16, wherein the compound is adsorbed on the surface.

18. The surface as claimed in claim 16, wherein a compound containing at least one $SO_3^-$ group also is immobilized on the surface.

19. The surface as claimed in claim 16, wherein the surface is a plastic surface of a shaped polymer.

20. A surface provided with carboxyl groups prepared in accordance with a method comprising the steps of:

(i) applying to a surface to be treated a compound with at least one functional group which can be converted onto a carboxyl group;

(ii) treating the surface with a plasma to immobilize the compound; and (iii) converting the functional group into a carboxyl group, wherein the surface is an inorganic surface.

21. A surface provided with carboxyl groups prepared in accordance with a method comprising the steps of:

(i) applying to a surface to be treated a compound with at least one functional group which can be converted into a carboxyl group;

(ii) treating the surface with a plasma to immobilize the compound; and (iii) converting the functional group into a carboxyl group, wherein the surface is an inorganic surface having a polymer applied thereto.

22. A medical device produce having a surface provided with carboxyl groups, the surface being suitable for exposure to blood, the surface having been prepared in accordance with a method comprised the steps of:

(i) applying to a surface to be treated a compound having at least one site with a non-carboxyl functional group which can be converted into a carboxyl group;

(ii) treating the surface with a plasma to immobilize the compound into an immobilized compound; and (iii) converting the non-carboxyl functional group into a carboxyl group, said medical device surface being provided with a carboxyl converted from said non-carboxyl functional group at said site on the immobilized compound.

23. The product as claimed in claim 22, wherein a compound containing at least one $SO_3^-$ group also is immobilized on the surface.

24. The product as claimed in claim 22, wherein the surface is a plastic surface of a shaped polymer.

25. A medical device product having a surface provided with carboxyl groups, the surface being suitable for exposure to blood, the surface having been prepared in accordance with a method comprising the steps of:

(i) applying to a surface to be treated a compound with at least one functional group which can be converted into a carboxyl group;

(ii) treating the surface with a plasma to immobilize the compound; and (iii) converting the functional group into a carboxyl group wherein the surface is an inorganic surface.

26. A medical device product having a surface provided with carboxyl groups, the surface being suitable for exposure to blood, the surface having been prepared in accordance with a method comprising the steps of:

(i) applying to a surface to be treated a compound with a least one functional group which can be converted into a carboxyl group;

(ii) treating the surface with a plasma to immobilize the compound; and (iii) converting the functional group into a carboxyl group wherein the surface is an inorganic surface having a polymer applied thereto.

* * * * *

UNITED STATES PATENT AND TRADEMARK OFFICE
CERTIFICATE OF CORRECTION

PATENT NO. : 5,658,967
DATED : August 19, 1997
INVENTOR(S) : Jan Feijen, Johannes G.A. Terlingen and Jan Pleun Lens It is certified that error appears in the above-indentified patent and that said Letters Patent is hereby corrected as shown below:

Item [57],
On the Cover Page, in the ABSTRACT, the last line, "in vivo" should be in italics.
Col. 2, line 49, "in vivo" should be in italics.
Col. 3, line 42, "containing and" should read --containing an--.
Col. 6, line 2, "converted onto" should read --converted into--; claim 22, line 1, delete "produce" and insert --product--; claim 22, line 4, delete "comprised" and insert --comprising--; claim 22, lines 12-13, "carboxyl converted" should read --carboxyl group converted--; claim 26, lines 5-6, "with a least" should read --with at least--.

Signed and Sealed this

Tenth Day of March, 1998

*Attest:*

BRUCE LEHMAN

*Attesting Officer*  Commissioner of Patents and Trademarks